United States Patent [19]
Benedetti et al.

[11] Patent Number: 6,016,367
[45] Date of Patent: Jan. 18, 2000

[54] METHOD FOR THE ACQUISITION OF IMAGES BY CONFOCAL

[75] Inventors: Pier Alberto Benedetti, Pisa; Valtere Evangelista, Capraia e Limite; Dante Guidarini; Stefano Vestri, both of Pisa, all of Italy

[73] Assignee: Consiglio Nazionale delle Ricerche, Roma, Italy

[21] Appl. No.: 08/935,298

[22] Filed: Sep. 22, 1997

[30] Foreign Application Priority Data

Sep. 25, 1996 [IT] Italy .................................. FI96A0220

[51] Int. Cl.$^7$ ....................................................... H01J 3/14
[52] U.S. Cl. .......................................... 382/275; 382/299
[58] Field of Search ........................... 382/275, 298–299, 382/254, 128, 132–134

[56] References Cited

U.S. PATENT DOCUMENTS

| | | | |
|---|---|---|---|
| 5,239,178 | 8/1993 | Derndinger et al. | 250/234 |
| 5,315,700 | 5/1994 | Johnston et al. | 395/163 |
| 5,381,236 | 1/1995 | Morgan | 356/376 |
| 5,563,962 | 10/1996 | Peters et al. | 382/261 |
| 5,737,456 | 4/1998 | Carrington et al. | 382/299 |

FOREIGN PATENT DOCUMENTS 4113279  10/1992  Germany .

*Primary Examiner*—Thomas D. Lee
*Assistant Examiner*—Stephen Brinich
*Attorney, Agent, or Firm*—Browdy and Neimark

[57] ABSTRACT

A method for the acquisition of images by means of confocal microscopy in which a new image is calculated which is constituted by the "maxima" among the corresponding elements of each captured image. The new image contains mainly the signal coming from the most luminous and in focus areas and even the signal coming from the less luminous areas, as being out of focus or laterally displaced with respect to the grid positions. A further image is then calculated which is constituted by the "minima" among the corresponding elements of each captured image and the requested confocal image is then obtained by calculating the difference between the "maxima" image and the "minima" image.

9 Claims, 7 Drawing Sheets

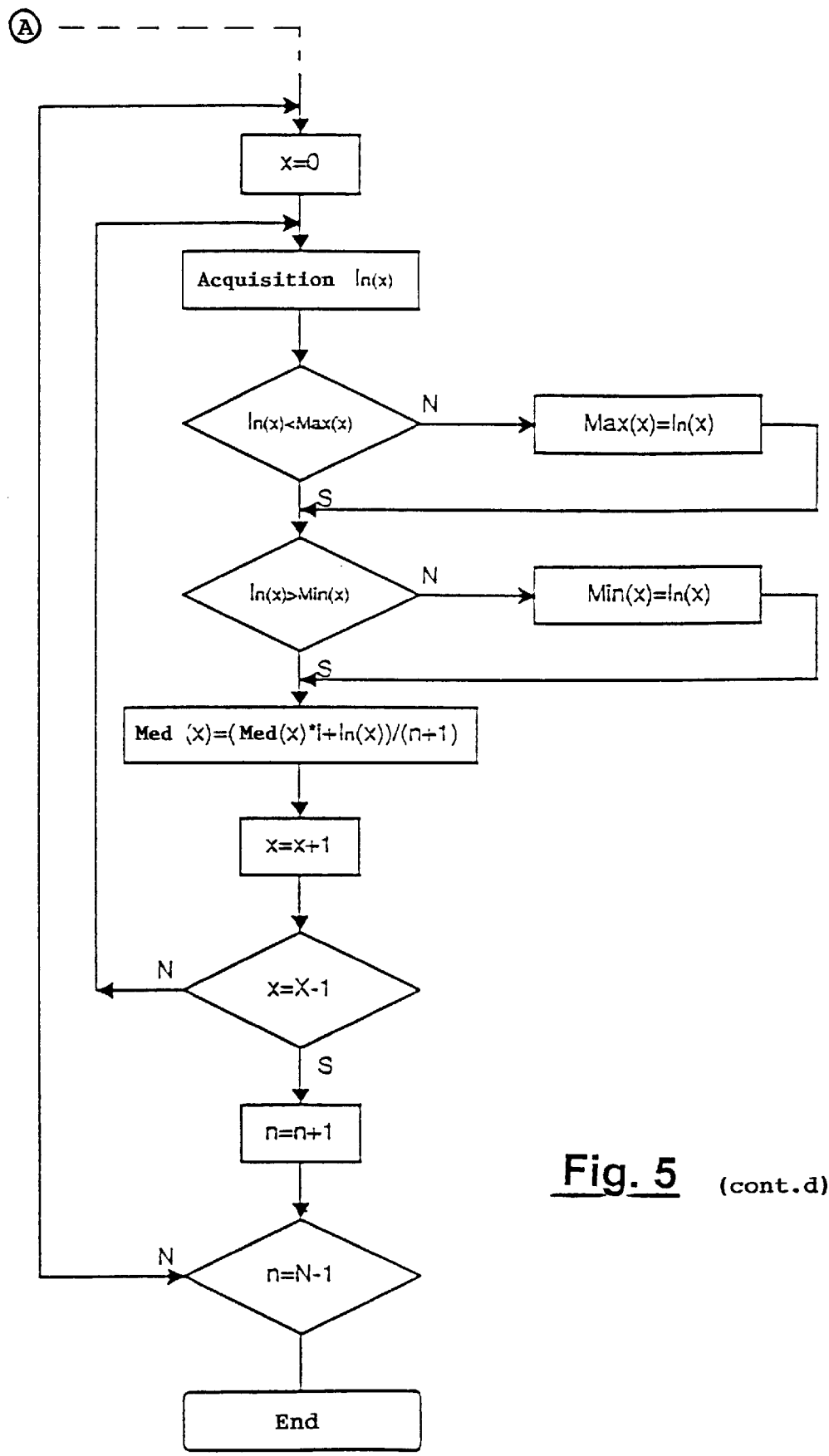
Fig. 5 (cont.d)

METHOD FOR THE ACQUISITION OF IMAGES BY CONFOCAL

FIELD OF THE INVENTION

The present invention relates to a method for the acquisition of images by means of confocal microscopy.

More particularly, the present invention relates to a method for the confocal images acquisition in optical systems for the analytical microscopy and in other optical systems with a relatively high numerical aperture involving the electronic images acquisition. The objects to be analysed can be absorbing (transmission), reflecting or fluorescent, and the optical arrangements can therefore vary among those for the analysis under transmitted or reflected light or under fluorescence.

DESCRIPTION OF THE PRIOR ART

The confocal microscopy, or anyway the analysis and the processing of images of objects by means of confocal systems with optical and electronical means, is a technique which grew considerably in recent years only. On this subject reference can be made to the article "Confocal Microscopy" by Jeff W. Lichtman, Scientific American, August 1994, as well as patent applications DE-A-4023650 published on Jan. 30, 1992, EP-B-0466979 published on Oct. 5, 1994 and other documents.

Confocal techniques are very effective when the relatively thick structure(s) under observation, of which a tridimensional structure must be obtained, are immersed in a relatively transparent and thin material.

When the structures to be analysed by a confocal method are in a relatively thick material and with light scattering properties, an increasing loss of contrast with the increase of the scattering occurs that may result in a poor observability or, in an extreme case, the inobservability of the interested microscopical structures.

According to the known art, the object of interest is illuminated by means of a group of light beams concentrated on positions belonging to a focus plane and arranged on said plane according to a ordered bidimensional grid. The complete lighting of the field under examination is obtained by the systematical displacement according two coordinates of the grid so as to cover all spaces among the focused light points originated by the grid.

SUMMARY OF THE INVENTION

According to the present invention, in order to carry out the acquisition of a confocal image, the acquisition of the set of partial images, obtained in correspondence to each position of the illumination grid in the focus plane is first carried out by means of an electronic image sensing device. In this way, a values distribution depending on the grid position is obtained for each image element.

According to the present invention confocal images are obtained by analysing the above mentioned values distribution by using statistical-mathematical procedures with an increasing degree of complexity and accuracy, of the type described below.

In particular, referring to a monodimensional example for sake of simplicity, according to the present invention a new image constituted by the maxima of luminosity among the corresponding elements of each captured image is calculated. The image calculated in this way, Max(x), has confocal characteristics as mainly contains the signal coming from the most luminous and in focus areas, even if a part of the signal coming from the less luminous areas is contained, as they are relatively out of focus or sideways displaced with respect to the grid positions.

Still according to the invention a second image, Min(x), constituted by the minima of luminosity among the corresponding elements of each captured image is then calculated. The second image mainly contains the signal coming from the less luminous areas in so far as they are less in focus or displaced sideways, while it tends to exclude the signal coming from the most luminous areas.

Consequently, the image of the luminosity maxima contains both the lighting due to the part in focus of the object under examination, and that of the less luminous part, not in focus, while the minima image tends to be affected only by the less luminous part and out of focus of them. As a consequence, according to the invention an image with enhanced confocal characteristics i.e. a more accurate optical section, is obtained by calculating the difference between the maxima image and the minima image. As a matter of fact, this allow to increase the contrast and to reduce the scattering effect of the material in which the object under examination is immersed.

In case of noise the above operation tends to shift the zero level. A further improvement of the invention, fit for avoiding the above shift of the zero level and even to increase the spatial resolution, consist in calculating a new image, Med(x), formed by the median values or by the average values among the corresponding elements of each of the captured images, and in carrying out a mathematical processing of the signal that can be represented by the formula.

$$K[\text{Max}(x) + \text{Min}(x) - 2\,\text{Med}(x)]$$

where K is a gain factor correlated to the shape of the lighting areas.

BRIEF DESCRIPTION OF THE DRAWINGS

The characteristics and the advantages of the method according to the present invention will be apparent from the following description of an actually preferred embodiment made as a not limiting example with reference to the attached drawings, in which.

DESCRIPTION OF A PREFERRED EMBODIMENT

Figure 1:
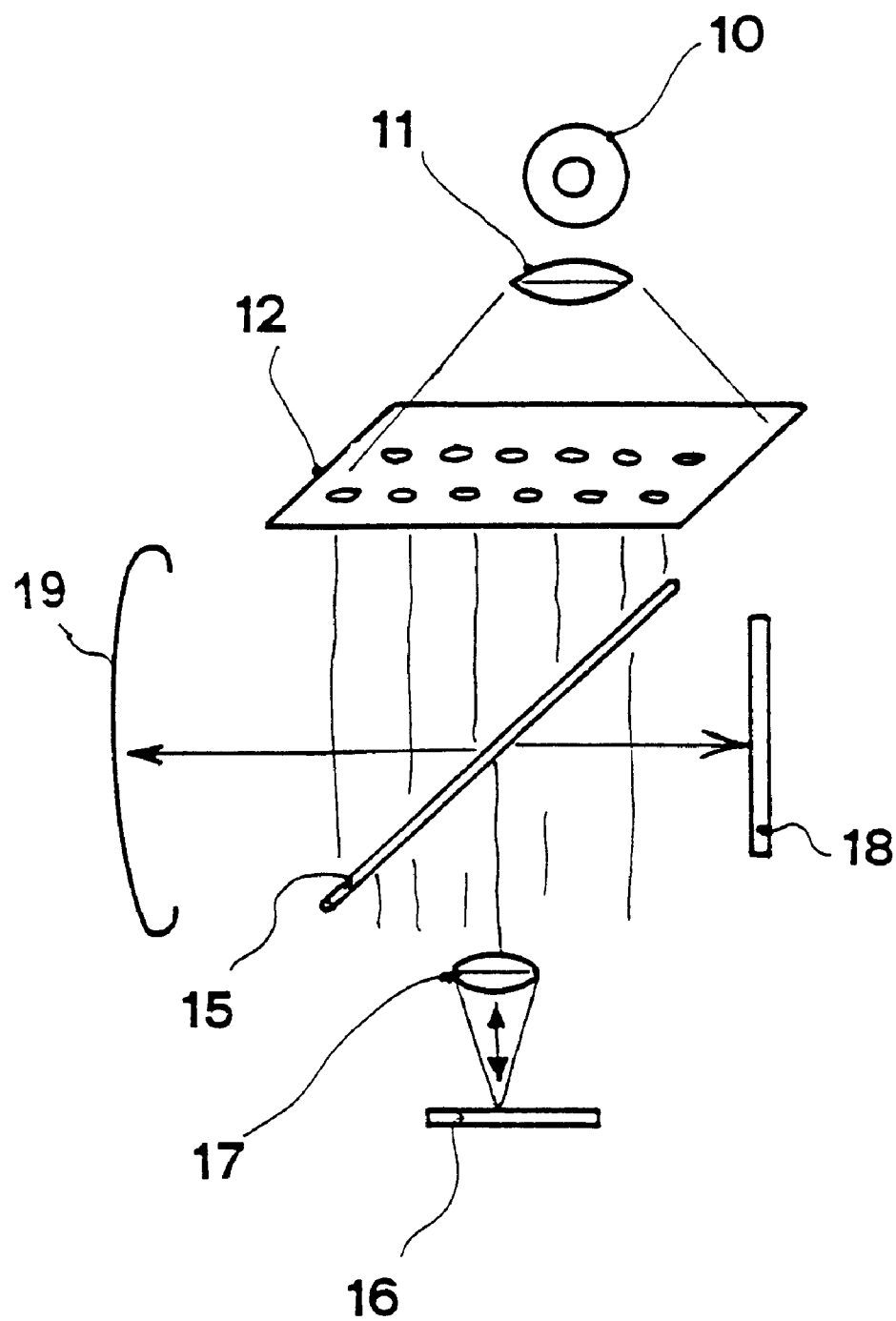
FIG. 1 is a general exemplifying diagram of a confocal microscopy system.

With reference to FIG. 1, the conventional general arrangement of a confocal microscope is shown herein. A light source 10 cooperates with a collimating lens 11, the output light beam of which passes through a hole matrix diaphragm 12 or equivalent device which is displaced according two coordinate axes x, y by means of motors, not shown, preferably by step motors. The structure formed by said hole matrix diaphragm can be replaced by a xy matrix scanning device formed by a liquid crystal light valve optoelectronic device and without moving mechanical parts. The light passing through hole matrix diaphragm 12 meets a beam divider 15. A part of the light crossing beam divider 15 is focused on a specimen 16 by means of a lens 17. The part of the light reflected at left of beam divider 15 is captured by a light trap 19 as well-known in these optical arrangements to eliminate back scattered disturbing light. The light returning from specimen 16 is directed to an image photoelectric sensor 18 such as a bidimensional CCD sensor. The operation of such an optical arrangement is well-known to a person skilled in the art and a detailed description is omitted.

As stated above, the optical system shown in FIG. 1 is relevant to the analysis by reflection of a specimen and an electromechanical system for the displacement of the hole matrix diaphragm 12 is provided. Different optical systems relevant to the specimen analysis by transmission and/or by fluorescence are included in the scope of the invention. In particular, it is included in the scope of the invention the use of optoelectronic means to carry out the scanning of the hole matrix diaphragm 12 or to perform in a different way the function of the illumination grid. This can be done, for example, by means of spatial light modulators without moving parts of the type disclosed by Fairfield and Vaytek in VIRTUAL MICROSCOPE, European Microscopy, May 1996. The same operation can also be carried out by using DMD (Digital Micromirror Device) devices as described by J. M. Younse in "MIRRORS ON A CHIP", IEEE Spectrum, November 1993.

Figure 2:
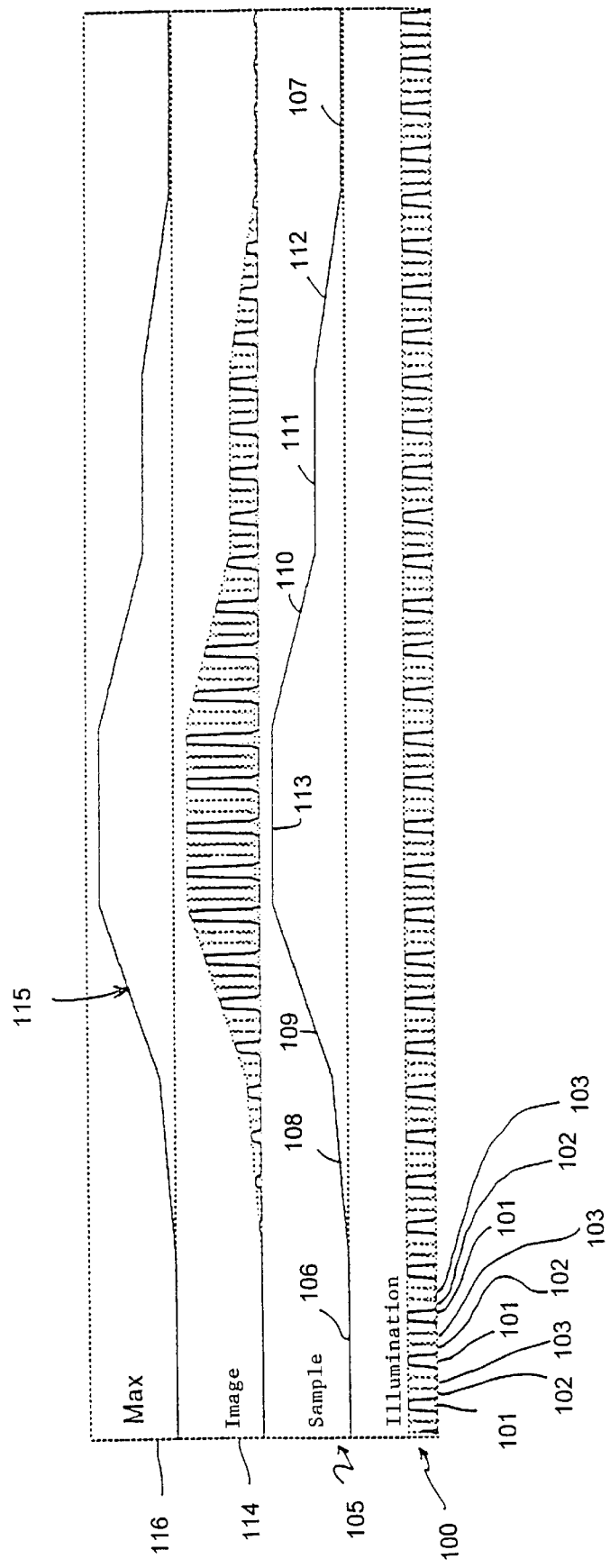
FIG. 2 is a wave form diagram of the signals of a system of light reflection microscopy of the image on a generic line of a matrix sensor as a function of the displacement of the illumination grid along an axis.
Figure 3:
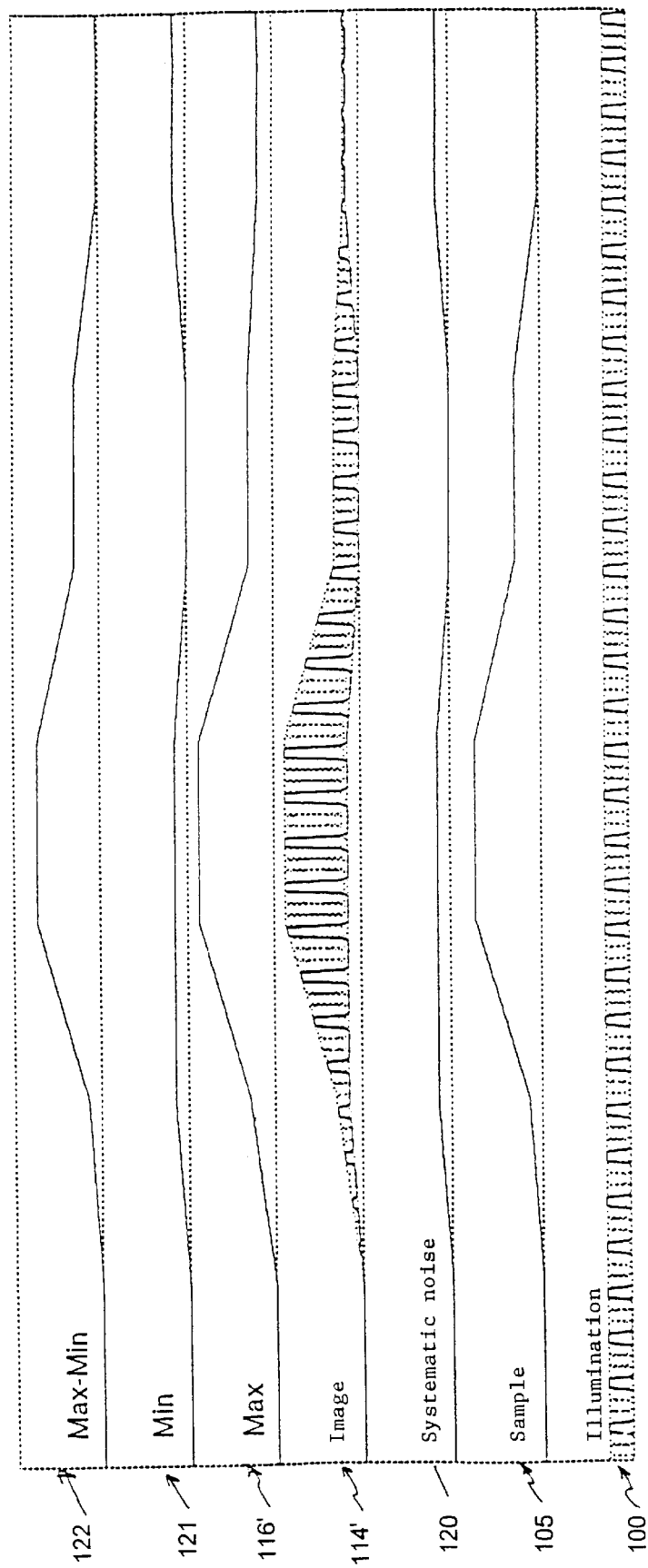
FIG. 3 is a diagram similar to that of FIG. 2 in which the result of the "maximum minus minimum" operation is shown.
Figure 4:
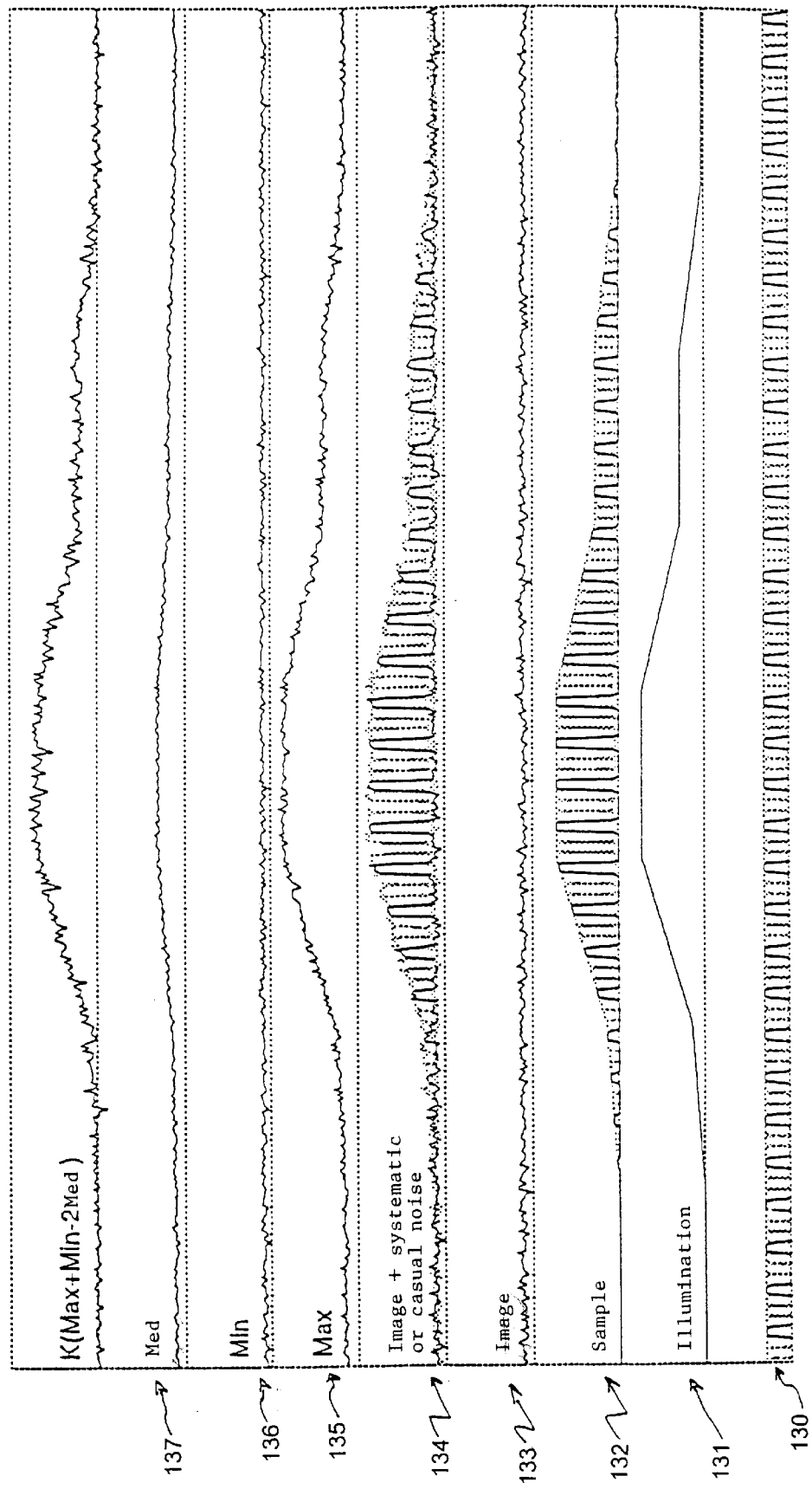
FIG. 4 is a diagram similar to those of FIGS. 2 and 3, in which the operation K (Max+Min−2Med) is executed.

The operation of the system according to the invention will now be described. With reference to FIGS. 2, 3 and 4 relate to a single scanning line through a generic specimen and are equal to those which could correspond to linear image sensor or to a generic scanning line passing through the specimen of a bidimensional image sensor. It has to be pointed out that the use of an image sensor of a linear or bidimensional type is given only by way of example of a commonly used optoelectronic sensor, and it is understood that the use of sensors of different type is included in the scope of the invention.

With reference in particular to FIG. 2, the horizontal axis represents the space that the specimen crosses, while the vertical axis represents relative intensity (or density) of the signal on an arbitrary scale in the various figures.

Line 100 indicates the confocal illumination process of the specimen carried out by the displacement, for example, along the x-coordinate of the hole matrix diaphragm or spatial modulator 12, as shown in FIG. 1. In line 100 peaks 101 are the illumination peaks of the specimen in a generic position m of diaphragm 12. Peaks 102, 103 are the displacement of peaks 101 in the positions m+1, m+2 respectively controlled by the motors that perform the displacement of diaphragm 12.

In the representation of FIG. 2 (and also of FIGS. 3 and 4) the "density" of the peaks is simplified and reduced with respect to the real condition. Line 105 shows the wave form diagram of the optical density (opacity) of a generic specimen, the path comprising portions 106, 107 having null optical density (perfect transparency) of the specimen and portions 108, 109, 110, 111, 112 having an intermediate optical density between the null density (106, 107) and the maximum one 113.

Line 114 shows the output of a detector such as a CCD photodetector (indicated at 18 in FIG. 1), said output being formed by an envelope of peaks corresponding to the peaks of line 100 spatially modulated by the optical density of the specimen shown in line 105.

If the light peaks of line 114 in correspondence to the scanning steps (x-axis) are extracted with a conventional data processing method, envelope 115 of line 116 is obtained representing a true reproduction of the specimen image details exemplified at line 105.

In FIG. 3 there is shown the signal processing according to the invention in which an unwanted background signal, of a systematic type and produced by the presence of something causing scattering in the specimen not being part of the interested image of the same, is removed. Lines 100 and 105 of FIG. 3 have the same meaning as the corresponding one of FIG. 2.

In the case of FIG. 3, an unwanted background signal or systematic noise indicated at line 120 is associated to curve 105 representing the specimen.

As a consequence of the photosensor output signal indicated at line 114', the "minima" of the specimen signal will be raised with respect to the base line of an amount corresponding to the background signal, which is shown alone by line 121 formed by drawing out the "minima" of image signal 114'.

Unless the operation of the invention would be carried out, the output signal would be that indicated at line 116' constituted by an envelope practically formed by adding the specimen signal (line 105) to the unwanted signal (line 120).

By subtracting signal 121 from signal 116' final signal 122 is obtained. Final signal 122 can be represented as A(Max−Min)⁻ where A is a proportionality constant that can be taken equal to 1.

It will be appreciated that the signal of line 122 is "cleared" of systematic noise 120, thus removing possible artifacts in the final image and improving the image contrast.

A variation of the processing method according to the invention, directed to remove (or, at least, significantly reduce) systematic and/or casual noises and the like is shown in FIG. 4.

Systematic noise have been previously defined. Casual noises can have various origin, for example a noise in the photoelectric sensor of the CCD detector, casual fluctuations of the light source (for example, casual instability of the arc light source, etc.).

Line 130 of FIG. 4 shows the illumination (likewise line 100 of FIG. 2). Line 131 shows the specimen density (likewise line 105 of FIGS. 2 and 3). Line 132 is the theoretical image of the specimen taken alone.

Line 133 shows the path of the possible systematic+casual noise. Line 134 shows the photoelectric sensor output signal, curve 135 the envelope of the "maxima" and line 136 the envelope of the "minima". Line 137 represents an average of the "maxima" and "minima" and line 138 represents the function K (Max+Min−2 Med) representing the final component coming from the system and constituting the final image.

In other words, during the scanning operation, according to i, the position of the illumination peaks changes. A set of vectors $I_i(x)$, numerically reproducing the intensity profile detected from the specimen, according to x, is thus obtained.

From $I_i(x)$ set the following vectors are obtained:

→Max (x) formed by the "maxima" of the corresponding elements being part of vectors $I_i(x)$ when i varies (FIGS. 4, line 135);

→Min(x), formed by the "minima" of the corresponding elements being part of vectors $I_i(x)$ when i varies (FIG. 4, line 136);

→Med(x), formed by the "averages" of the corresponding elements being part of vectors $I_i(x)$ when i varies (FIG. 4, line 137).

From the above vectors the following results can be obtained:

A) Max(x)

It detects the amplitude of the confocal signal in the presence of thin objects and in the presence of noises. The presence of systematic noise (background, thick object, etc.) and the amplitude of the casual noise sum up to the signal.

B) Max(x)−Min(x)

It detects the amplitude of the confocal signal even in the presence of systematic noise (background, thick object, etc.). The amplitude of the casual noise is still summed up.

C) K [Max(x)+Min(x)−2Med(x)]

It detects the amplitude of the confocal signal correctly, even in the presence of systematic or casual noise. It requests a gain factor K, which is a function of the shape of the illumination areas. If R is the modulation rate dark/light, then K=(R+1)/(R−1).

Figure 5:
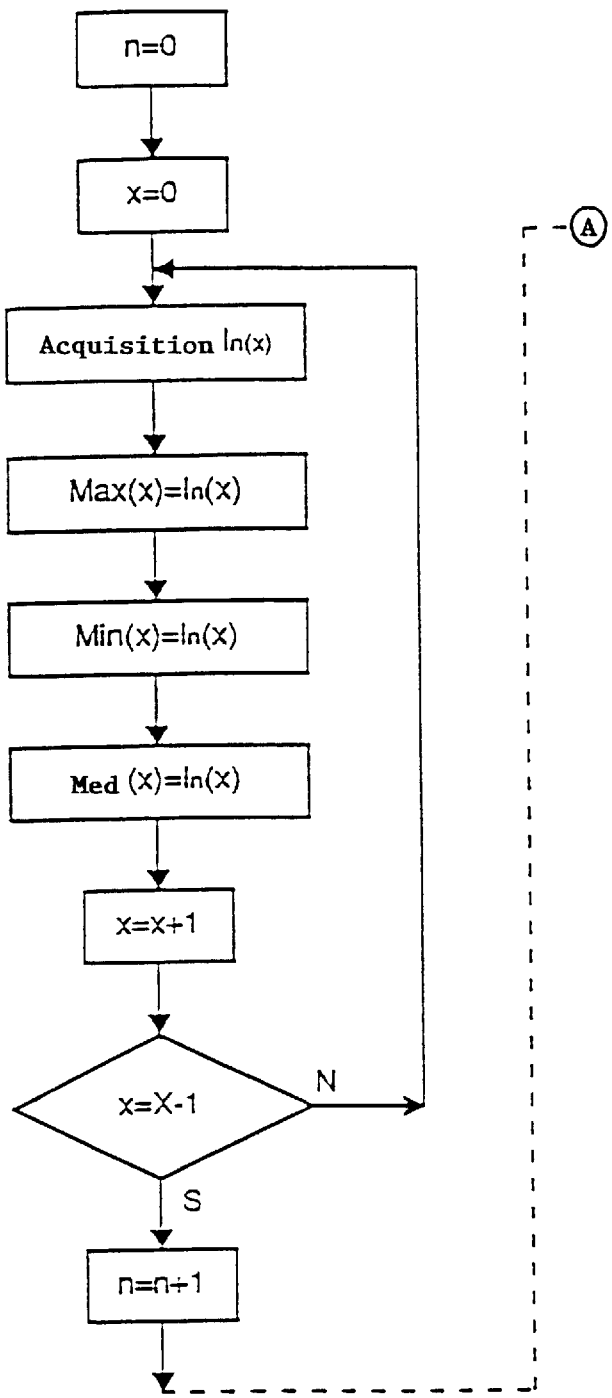
FIG. 5 is a possible data processing block flow diagram for the system of the invention.

A block flow diagram of the algorithm, which, as an example, implements the operation mentioned above and shown in FIG. 3, is shown in FIG. 5. With reference to FIG. 5, being X the number of elements of a monodimensional image detector and N the number of displacements needed to cover all the spaces between the lighting points originated by the illuminating diaphragm, the flow chart shows the complete procedure to obtain a monodimensional confocal image.

Setting the indexes n and x to zero the first image $I_o(x)$ is captured and the vectors Max(x), Min(x) and Med(x) are initialized directly copying the vector $I_o(x)$ into them, this operation being made for all x until the condition x<X is verified. The index n is incremented, this corresponding to a further position of the diaphragm. The index x is set to zero again and a new image is acquired. The elements of the vectors Max(x) and Min(x) are compared, with respective elements of In(x), and conveniently updated. The calculation of the vector Med(x) follows. The loop continues until both the conditions x<X and n<N are verified.

Finally, confocal images can be obtained by the following expressions:

a) I=Max(x)

b) I=Max(x)−Min(x)

c) I=K(Max(x)+Min(x)−2Med(x))

Figure 6:
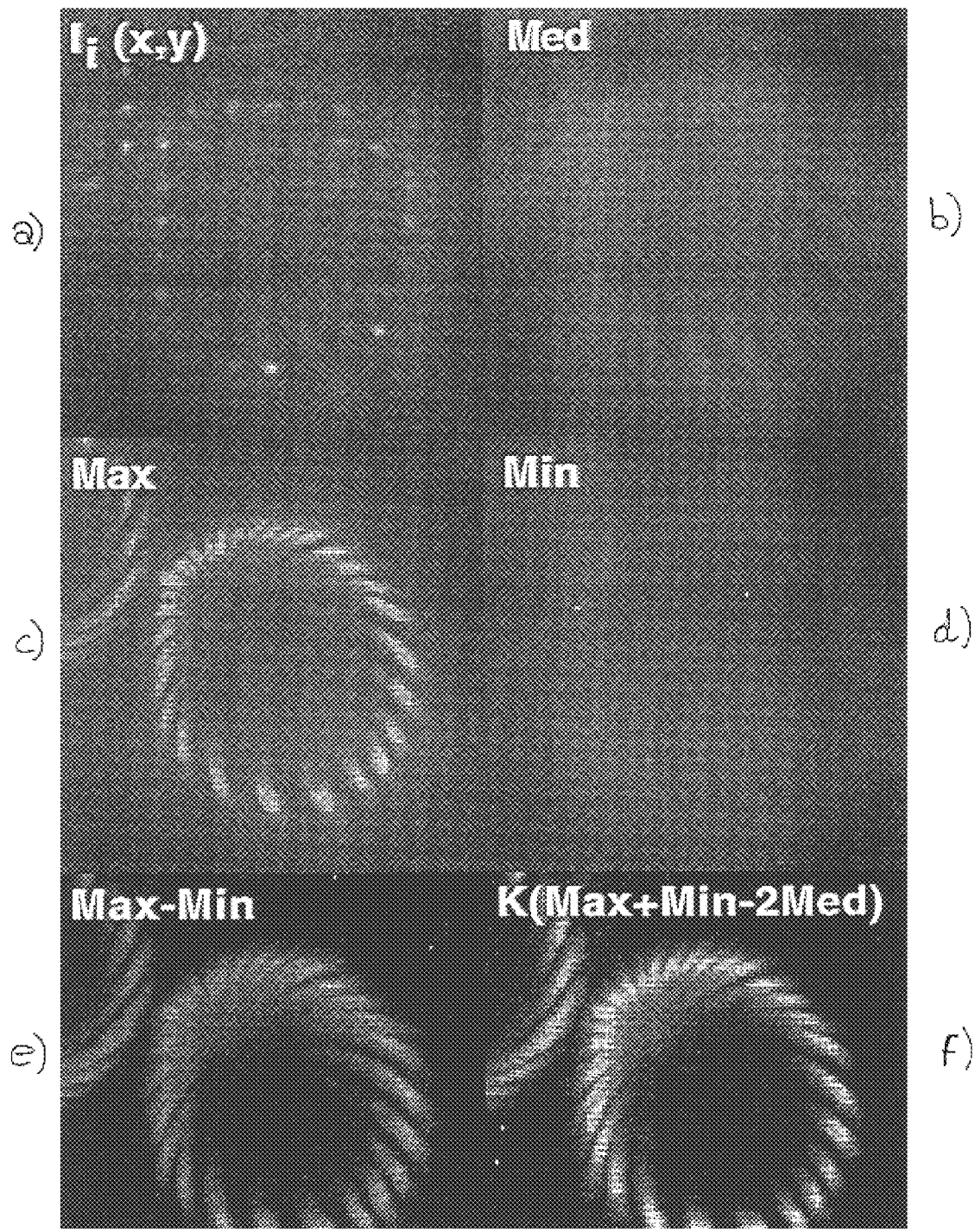
FIG. 6, particulars a) , b) , c) , d) , e) , f) , shows various images from the initial condition to the final one in an image processing method as shown in FIG. 4.

In the particulars a), b), c), d), e) and f) of FIG. 6 photographs of images corresponding to the above mentioned operations, identified by a relevant legend, carried out in the presence of a real microscopic object are shown. FIG. 6 is not described in further detail as deemed self-explanatory for a person skilled in the art.

The present invention has been described with reference to an actually preferred embodiment and exemplified with reference to reflexion microscopy and a spatial modulator of mechanical type, but a person skilled in the art will understand that the object of the invention can be also applied to transmission systems or fluorescence systems and even to systems using spatial modulators of the optoelectronic type without moving mechanical parts. All these variations are deemed to be encompassed in the scope of the invention as set forth in the appended claims.

We claim:

1. A confocal microscopy method for acquiring a confocal image of an object to be analyzed, comprising:

illuminating the object to be analyzed by a group of light beams concentrated on positions in a focus plane, the positions being arranged on the focus plane according to an ordered grid of light sources, carrying out a complete illumination of the area under examination by systematically displacing (X) the grid, so as to cover all interposed spaces, acquiring a confocal optical section by first of all acquiring through an image electronic sensor a set of partial images corresponding to each position of said ordered grid of light sources on the focus plane, and calculating said confocal image by taking only maxima of transmitted light (Max) among all image elements of each captured confocal image, said image being expressed as $$\text{confocal image}=\text{Max}(x).$$

2. The method according to claim 1, comprising:

calculating a further image including minima of transmitted light (Min) containing mainly a signal coming from less-luminous areas of the object; and obtaining a new image by calculating a difference image between the image of maxima of transmitted light (Max) and the image of minima of transmitted light (Min), said difference image being expressed as:

$$\text{confocal image}=\text{Max}(x)-\text{Min}(x).$$

3. The method according to claim 2, wherein the confocal image is expressed by a formula:

$$\text{confocal image}=K\{\text{Max}(x)-\text{Min}(x)-2\text{Med}(x)\},$$

where K is a gain factor which is a function of a shape of illumination areas and Med(x) is a vector formed by average values or median values of light distribution relevant to each element of the captured images when varying the position of the grid.

4. The method according to claim 1, wherein the step of displacing the ordered grid of light sources comprises scanning over an optoelectronic system without moving mechanical parts.

5. The method according to claim 4, wherein the optoelectronic system comprises an optoelectric device.

6. The method according to claim 5, wherein the optoelectronic device comprises a liquid crystal matrix light valve.

7. The method according to claim 1, comprising performing a tridimensional analysis of the object by varying focusing of the system or displacing the specimen along the optical axis so as to obtain a prefixed number of optical sections through a whole thickness thereof.

8. An apparatus for performing the method according to claim 1.

9. The apparatus according to claim 8, comprising a reflection, transmission, or fluorescence type confocal system.

* * * * *

UNITED STATES PATENT AND TRADEMARK OFFICE
CERTIFICATE OF CORRECTION

PATENT NO. : 6,016,367      Page 1 of 3

DATED : January 18, 2000

INVENTOR(S) : Pier Alberto Benedetti, et al.

It is certified that error appears in the above-identified patent and that said Letters Patent is hereby corrected as shown below:

Title page, line [54], in the title , insert after "CONFOCAL",
--MICROSCOPY--.

Figure 5A:
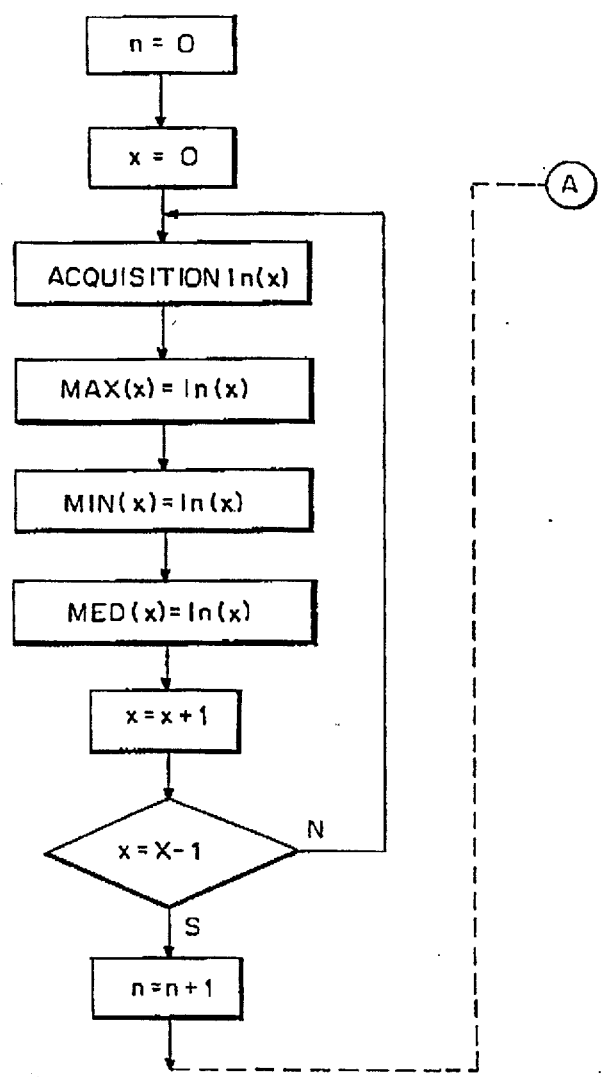

Column 2, line 55, delete "FIG. 5 is" and insert -- Figs, 5A and 5B, Fig.B being a continuation of FIG. 5A, are--.

Figure 5B:
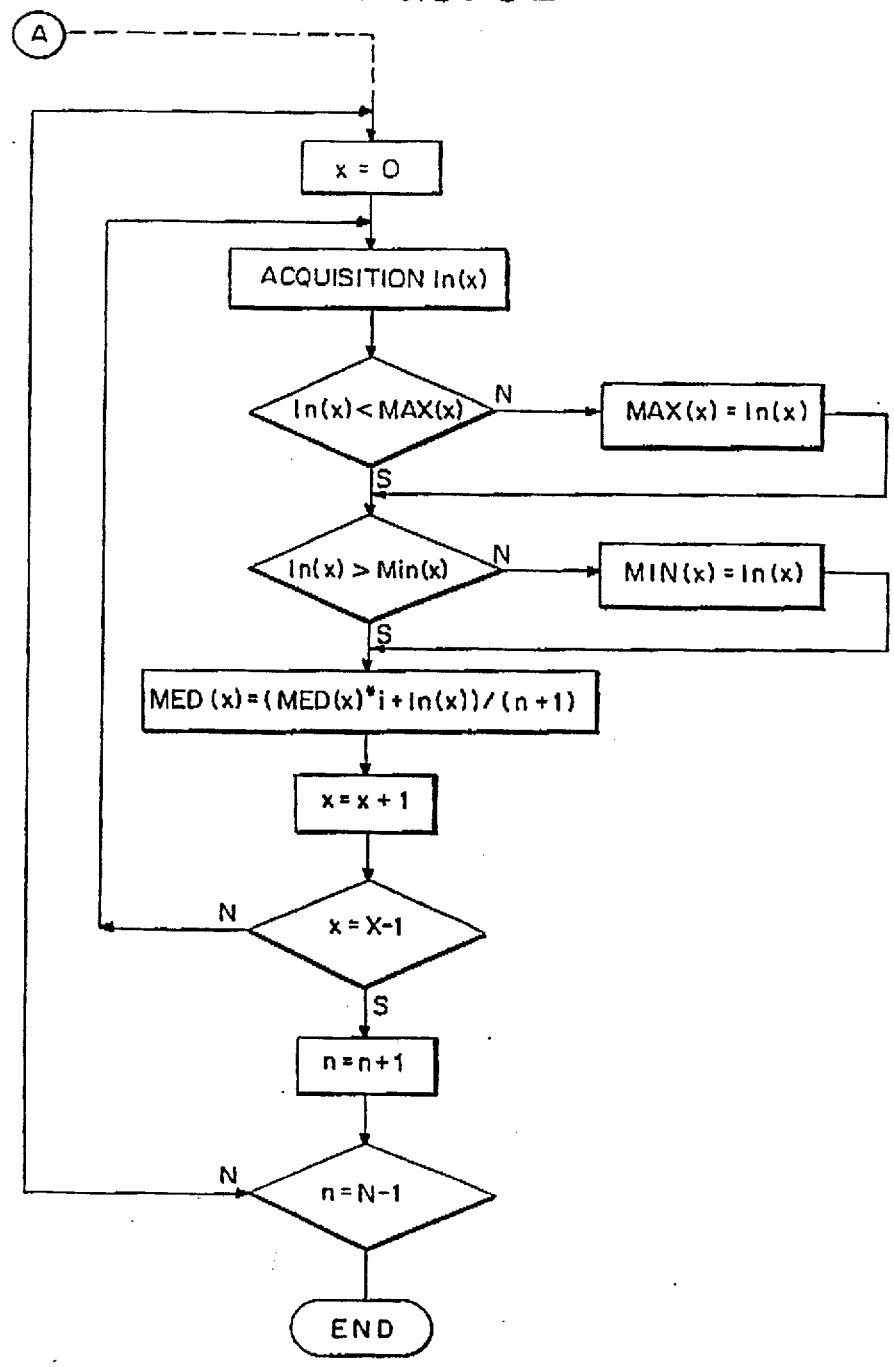

Column 5, lines 26 and 27, change "FIG. 5" to --FIGS. 5A and 5B--.

In the drawings, substitute drawing sheets 5 of 7 and 6 of 7 with the attached drawing sheets.

Signed and Sealed this

Twelfth Day of December, 2000

*Attest:*

Q. TODD DICKINSON

*Attesting Officer*     *Director of Patents and Trademarks*